United States Patent
Ghosh et al.

(10) Patent No.: US 11,704,610 B2
(45) Date of Patent: Jul. 18, 2023

(54) BENCHMARKING FOR AUTOMATED TASK MANAGEMENT

(71) Applicant: Accenture Global Solutions Limited, Dublin (IE)

(72) Inventors: Bhaskar Ghosh, Bangalore (IN); Mohan Sekhar, Bangalore (IN); Vijayaraghavan Koushik, Bangalore (IN); John Hopkins, London (GB); Rajendra T. Prasad, Bangalore (IN); Mark Lazarus, Caulfield (AU); Krupa Srivastava, Chennai (IN)

(73) Assignee: Accenture Global Solutions Limited, Dublin (IE)

(*) Notice: Subject to any disclaimer, the term of this patent is extended or adjusted under 35 U.S.C. 154(b) by 437 days.

(21) Appl. No.: 15/843,607

(22) Filed: Dec. 15, 2017

(65) Prior Publication Data
US 2019/0066016 A1    Feb. 28, 2019

(30) Foreign Application Priority Data
Aug. 31, 2017  (IN) .............................. 201741030909

(51) Int. Cl.
*G06Q 10/0631*    (2023.01)
*G06Q 10/0633*    (2023.01)
(Continued)

(52) U.S. Cl.
CPC ... *G06Q 10/06313* (2013.01); *G06Q 10/0633* (2013.01); *G06Q 10/06393* (2013.01); *G06F 11/3428* (2013.01)

(58) Field of Classification Search
CPC .. G06F 3/0484; G06F 11/368; G06F 11/3688; G06Q 10/06313; G06Q 10/0633; G06Q 10/06393; G06Q 30/016
See application file for complete search history.

(56) References Cited

U.S. PATENT DOCUMENTS 8,185,877 B1 *  5/2012  Colcord .................... G06F 9/44
                                                      717/124
9,032,373 B1 *  5/2015  Gupta .................. G06F 11/3688
                                                     717/127
(Continued)

OTHER PUBLICATIONS

Menzies, T., Raffo, D., Setamanit, S. O., DiStefano, J., & Chapman, R. M. Why Mine Software Repositories?. May 25, 2004. MSR 2004: International Workshop on Mining Software Repositories. (Year: 2004).*
(Continued)

*Primary Examiner* — Brian M Epstein
*Assistant Examiner* — Sara Grace Brown
(74) *Attorney, Agent, or Firm* — Harrity & Harrity, LLP

(57) ABSTRACT

A device may detect a trigger to perform a benchmarking task. The benchmarking task may include a first benchmarking of a first resource utilization associated with one or more tasks completed via an automated procedure. The benchmarking task may include a second benchmarking of a second resource utilization associated with the one or more tasks completed via a manual procedure. The device may determine project data relating to a project platform based on detecting the trigger to perform the benchmarking task. The device may process the project data relating to the project platform to benchmark the project. The device may generate a recommendation relating to completion of the one or more tasks using the automated procedure or the manual procedure. The device may communicate with one or more other devices to perform a response action based on the recommendation.

20 Claims, 6 Drawing Sheets

(51) Int. Cl.
*G06Q 10/0639* (2023.01)
*G06F 11/34* (2006.01)

(56) References Cited

U.S. PATENT DOCUMENTS

| | | | | |
|---|---|---|---|---|
| 10,628,394 | B1* | 4/2020 | Gurspan | G06F 11/368 |
| 10,949,325 | B1* | 3/2021 | Culibrk | G06F 11/3612 |
| 2009/0144120 | A1* | 6/2009 | Ramachandran | G06Q 10/06 705/7.27 |
| 2010/0318970 | A1 | 12/2010 | Grechanik et al. | |
| 2012/0072968 | A1* | 3/2012 | Wysopal | G06F 11/3612 726/1 |
| 2015/0082277 | A1* | 3/2015 | Champlin-Scharff | G06F 11/368 717/120 |
| 2015/0095847 | A1* | 4/2015 | Kleinhout | G06F 3/0484 715/784 |
| 2016/0132828 | A1* | 5/2016 | Hartung | G06Q 10/103 705/7.39 |
| 2017/0249642 | A1* | 8/2017 | Burpulis | G06Q 30/016 |
| 2017/0372247 | A1* | 12/2017 | Tauber | G06F 11/3668 |
| 2018/0039570 | A1* | 2/2018 | Rajagopalan | G06F 11/3688 |
| 2018/0053134 | A1* | 2/2018 | Olshanetsky | G06F 8/60 |
| 2018/0181898 | A1* | 6/2018 | Viswanath | G06N 5/04 |
| 2018/0247223 | A1* | 8/2018 | Bordoloi | G06N 5/022 |
| 2018/0357586 | A1* | 12/2018 | Goergen | G06Q 10/06393 |
| 2019/0019111 | A1* | 1/2019 | Sun | G06F 11/3688 |
| 2019/0311287 | A1* | 10/2019 | Chew | G06F 11/3495 |

OTHER PUBLICATIONS

Devasena, M., Valarmathi M., Meta Heuristic Search Technique for Dynamic Test Case Generation, Feb. 2012, International Journal of Computer Applications (0975-8887), vol. 39—No. 12 (Year: 2012).*

Valentin Dallmeier, Thomas Zimmerman, "Extraction of Bug Localization Benchmarks from History," Nov. 5-9, 2007, ASE'07 , (Year: 2007).*

Hoffman D., "Cost Benefits Analysis of Test Automation," Software Quality Methods, LLC. 1999, pp. 1-13. [retrieved on Feb. 1, 2019] Retrieved from the Internet [URL: https://www.agileconnection.com/sites/default/files/article/file/2014/Cost-Benefit%20Analysis%20of%2 . . . .

Kalibera T et al., "Automated Benchmarking and Analysis Tool," Value tools '06, Proceedings of the 1st International Conference on Performance Evaluation Methodolgies and Tools, Oct. 2006, 10 pages.

* cited by examiner

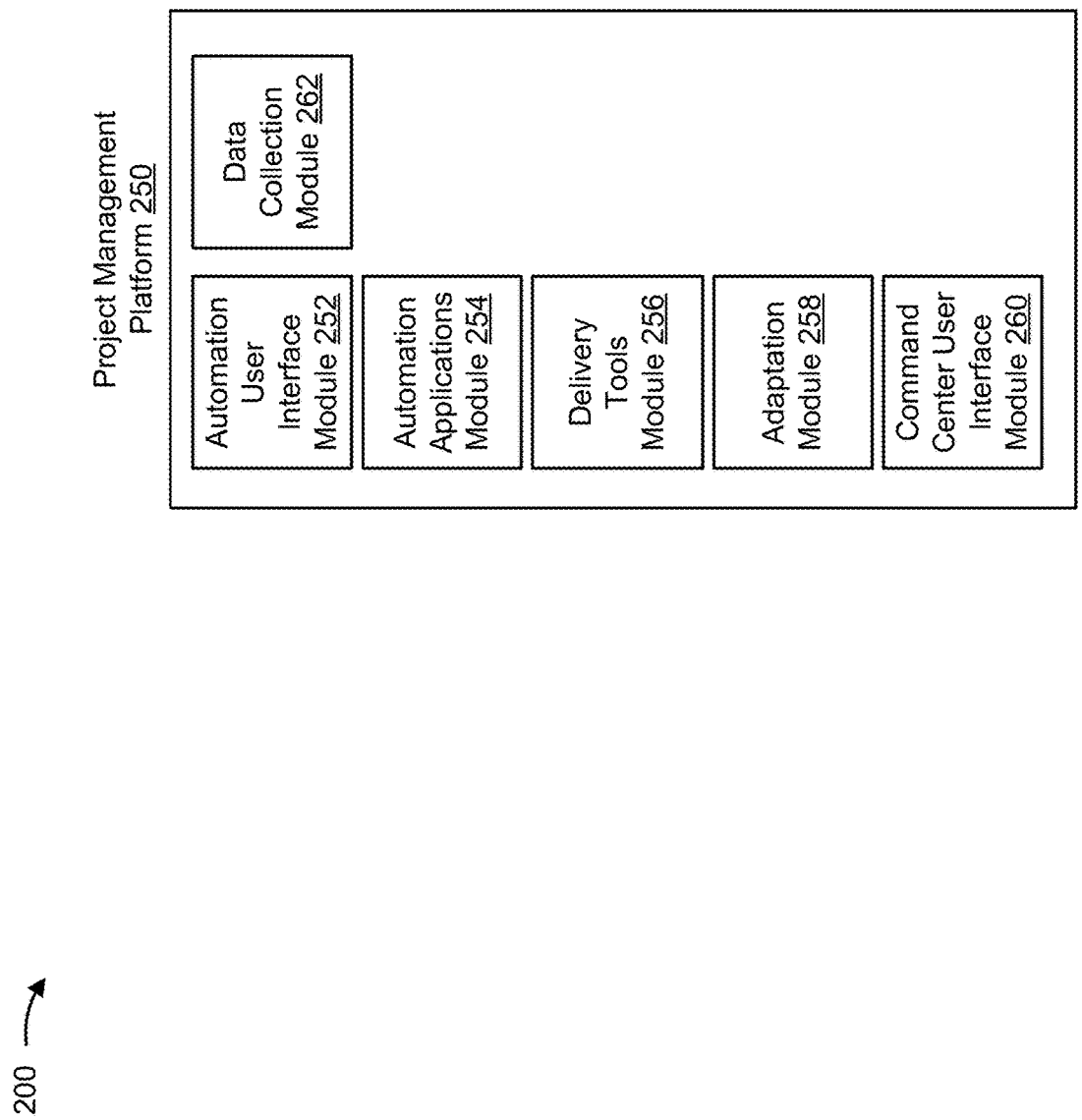

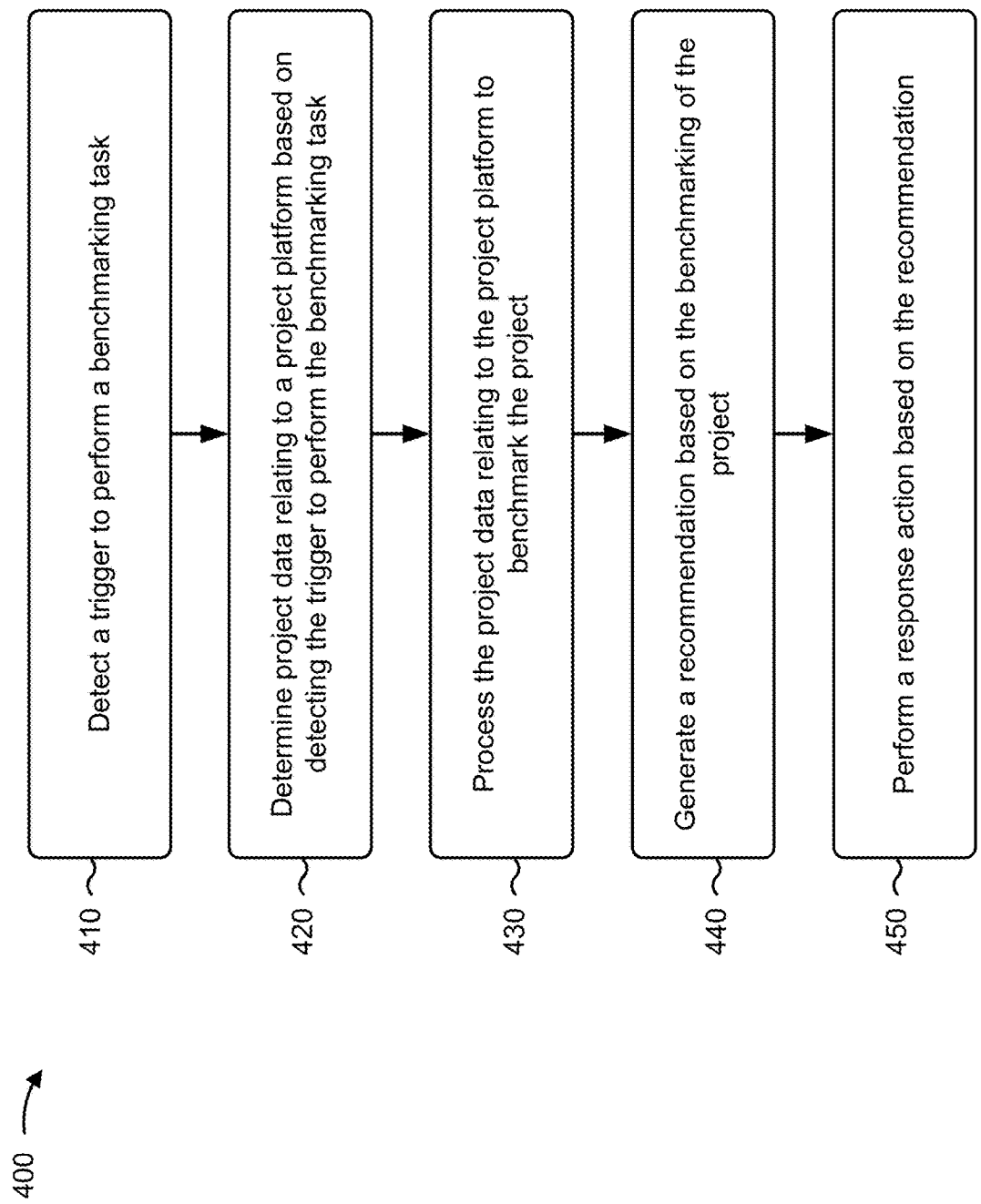

BENCHMARKING FOR AUTOMATED TASK MANAGEMENT

RELATED APPLICATION

This application claims priority under 35 U.S.C. § 119 to Indian Patent Application No. 201741030909, filed on Aug. 31, 2017, the content of which is incorporated by reference herein in its entirety.

BACKGROUND

Software development is, generally, the end-to-end process of creating software programs for a system, embodying stages throughout a system's development life cycle. The traditional model of development, such as the waterfall model, may include the phases of identification of required software, analysis and specification of software requirements, software design, programming (i.e., coding), testing, and maintenance of code. Software project management includes involvement of the end users, communication among customers/clients, users, and software developers, articulation of project goals, accurate estimation of resources, and specification of system requirements. A project management platform may be deployed to automate some tasks of software development, such as coding tasks, testing tasks, ticket resolution tasks, or the like.

SUMMARY

According to some possible implementations, a device may include one or more processors. The one or more processors may detect a trigger to perform a benchmarking task. The benchmarking task may include a first benchmarking of a first resource utilization associated with one or more tasks completed via an automated procedure. The benchmarking task may include a second benchmarking of a second resource utilization associated with the one or more tasks completed via a manual procedure. The one or more processors may determine project data relating to a project platform based on detecting the trigger to perform the benchmarking task. The one or more processors may process the project data relating to the project platform to benchmark the project. The one or more processors may generate a recommendation relating to completion of the one or more tasks using the automated procedure or the manual procedure. The one or more processors may communicate with one or more other devices to perform a response action based on the recommendation.

According to some possible implementations, a method may include detecting, by a computing resource in a cloud computing environment, a trigger to perform a benchmarking task. The method may include determining, by the computing resource, project data relating to a project platform based on detecting the trigger to perform the benchmarking task. The method may include processing, by the computing resource, the project data relating to the project platform to benchmark the project. The benchmarking of the project may include information identifying a resource utilization savings of automating a task using the project platform relative to manual completion of the task. The task may be a software development task. The method may include communicating, by the computing resource, with one or more other devices to provide a report identifying the resource utilization savings.

According to some possible implementations, a non-transitory computer-readable medium may store one or more instructions. The one or more instructions, when executed by one or more processors, may cause the one or more processors to determine project data relating to a project platform to perform a benchmarking task for a project. The project platform may be a cloud computing environment implemented project management platform providing a plurality of project management tools. The one or more instructions, when executed by the one or more processors, may cause the one or more processors to process the project data relating to the project platform to benchmark the project for at least one of the plurality of project management tools. The one or more instructions, when executed by the one or more processors, may cause the one or more processors to generate a recommendation relating to completion of one or more tasks using the at least one of the plurality of project management tools. The one or more instructions, when executed by the one or more processors, may cause the one or more processors to communicate with one or more other devices to perform a response action based on the recommendation.

BRIEF DESCRIPTION OF THE DRAWINGS

FIGS. 2A-2C are diagrams of an example environment in which systems and/or methods, described herein, may be implemented;

FIG. 4 is a flow chart of an example process for benchmarking for automated task management.

DETAILED DESCRIPTION

Figure 1:
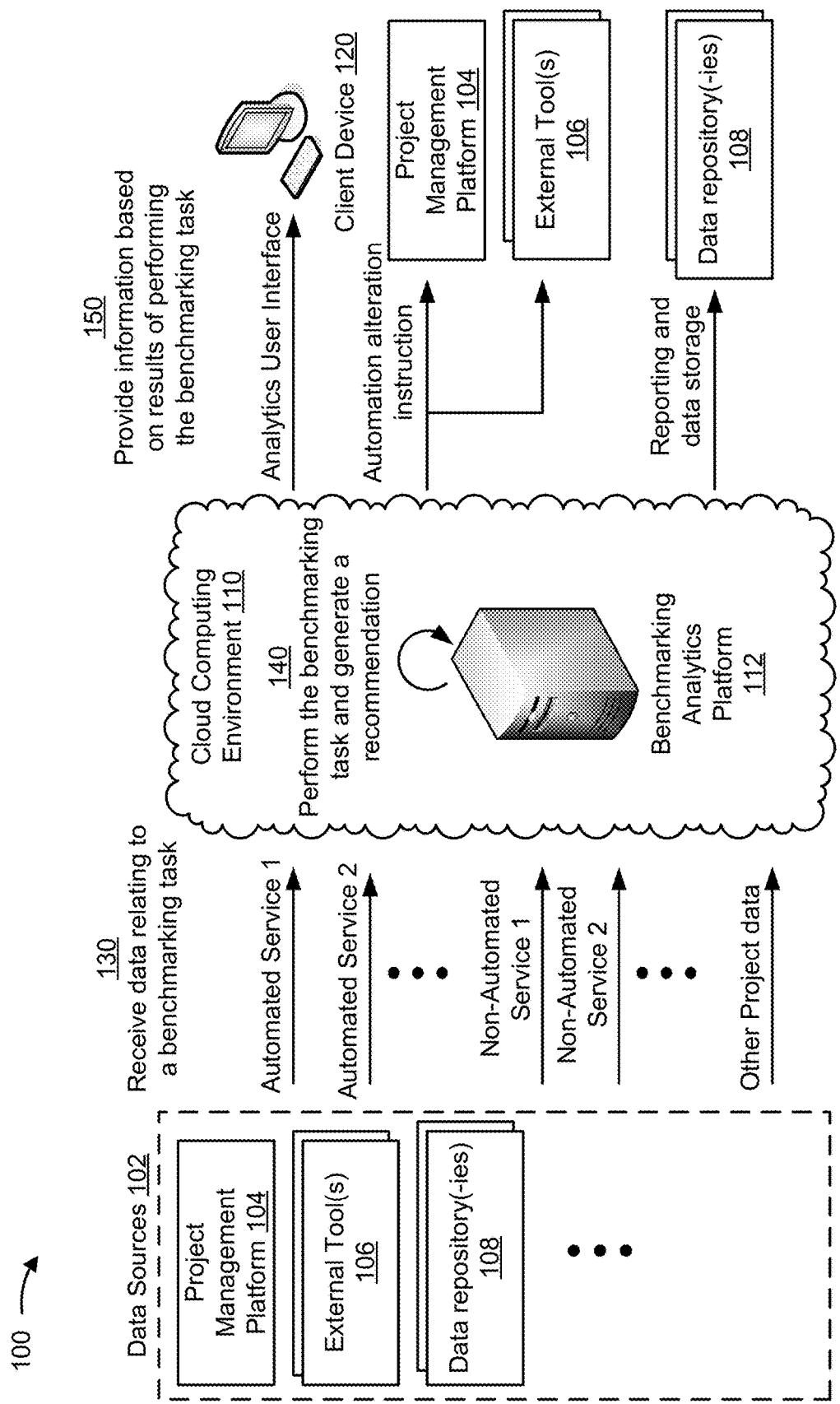
FIG. 1 is a diagram of an overview of an example implementation described herein.

The following detailed description of example implementations refers to the accompanying drawings. The same reference numbers in different drawings may identify the same or similar elements.

A project manager (e.g., a first party) may manage a software development project for a client (e.g., a second party). The project manager may manage a set of developers to author program code for the software development project to satisfy requirements provided by the client. For example, the client may provide requirements relating to accessibility, functionality, security, error management, and/or the like. After the project is completed, the client may test the program code to determine that the program code satisfies the requirements, and may publish the program code for use by a set of users. Another project manager may resolve ongoing issues relating to the program code. For example, when a user of the program code identifies an error, the user may submit a ticket relating to the error for resolution by the other project manager.

However, managing development of a project and/or ongoing use of the project may be resource intensive, while also being prone to human error. This may result in poor user experience, and may lead to excessive use of computing resources (e.g., from a person authoring program code, creating work schedules for subordinates, managing finances of a project, researching an issue, providing a failed recommendation for the issue, re-researching to identify another recommendation for the issue, etc.). In other cases, managing a project (with or without human intervention) may be difficult due to a project management platform receiving a large volume of data relating to multiple aspects of a project. This may result in high computer processing and/or storage costs. For example, applying a project management system in a field that uses big data may require classifying and/or processing tens of thousands, hundreds, thousands, or even millions of data points. Moreover, aspects of a project may be managed 24 hours a day and 365 days a year, which may require excessive cost for human based monitoring. Furthermore, human based monitoring may be error prone, resulting in increased processing to correct human errors.

A project management platform may be deployed to automatically manage multiple phases of a project, including a development phase of a project, a testing phase of a project, a use phase of a project, and/or the like. The project management platform may include integration of artificial intelligence and/or machine learning components to permit natural language based interaction with the project management platform. In this way, the project management platform reduces utilization of computing resources based on faster completion of projects and resolution of issues relating to a project (e.g., less resources may be needed to develop the project, resolve a ticket, etc.), reduces utilization of computing resources and/or network resources based on decreasing a period of time where a network device is using additional resources to complete a task (e.g., a network device may use less resources to complete a task when operating properly), improves scalability of project management (e.g., a network device can be configured to manage larger projects, additional aspects of the project, or the like without a delay associated with hiring new employees and training new employees and a computing resource utilization associated with providing computers for the new employees), and/or the like. By reducing the utilization of computing resources, the project management platform improves overall system performance due to efficient and effective allocation of resources. Furthermore, faster completion of projects and resolution of issues relating to projects improves user experience and minimizes time lost due to project delays or a project issue (e.g., a user may be unable to use a software development platform when the software development platform is incomplete or experiencing a technical error).

However, for some projects, only a subset of tasks may be selected for automation using a project management platform or another type of platform. For example, a project manager may decide that an initial resource cost (e.g., a monetary cost, a time cost, a computing resource cost, etc.) associated with automating tasks (e.g., configuring the project management platform, installing or obtaining computing resources for the project management platform, etc.) may be excessive relative to manually completing one or more tasks. Moreover, a task that is initially determined to be more resource-effective as a manual task may, over time, change to being more resource-effective as an automated task (i.e., a task completed using an automated procedure, such as using a project management platform) (e.g., a ticket resolution task may be more resource-efficient as a manual task (i.e., a task completed using a manual procedure) for fewer than a threshold quantity of tickets, but may become more resource-efficient as an automated task for greater than the threshold quantity of tickets).

Some implementations, described herein, may provide benchmarking for automated task management. For example, some implementations, described herein, may provide an initial recommendation of tasks for automation, may monitor a software development project to determine if a task should be changed between manual performance and automated performance, may provide reporting regarding a resource-savings associated with automated performance, and/or the like. In this way, some implementations described herein may reduce a utilization of computing resources relative to selecting tasks for automated completion or manual completion based on human intuition, based on an initial determination and without reevaluation, or the like.

FIG. 1 is a diagram of an overview of an example implementation 100 described herein. As shown in FIG. 1, example implementation 100 may include a set of data sources 102, such as project management platform 104, one or more external tools 106 (hereinafter referred to individually as "external tool 106," and collectively as "external tools 106"), one or more data repositories 108 (hereinafter referred to individually as "data repository 108," and collectively as "data repositories 108"), and/or the like. Example implementation 100 may further include a cloud computing environment 110, which may host a benchmarking analytics platform 112, and a client device 120.

As further shown in FIG. 1, and by reference number 130, benchmarking analytics platform 112 may receive data, from data sources 102, relating to a benchmarking task. For example, benchmarking analytics platform 112 may receive data relating to one or more automated services (e.g., automated service 1, automated service 2, etc.), one or more non-automated services (e.g., non-automated service 1, non-automated service 2, etc.), and/or the like. Additionally, or alternatively, benchmarking analytics platform 112 may receive project data, such as data identifying a project for which one or more automation tasks are being performed using an automated service, another project for which one or more automation tasks were performed using an automated service, and/or the like.

In some implementations, benchmarking analytics platform 112 may receive the data relating to the benchmarking task at an initiation of a project. For example, when a project is to be performed and tasks of the project are to be assigned as automated tasks or manual tasks, benchmarking analytics platform 112 may identify the tasks of the project, and may obtain data to benchmark a resource utilization for tasks of the project when performed using an automated service, a non-automated service, and/or the like. Additionally, or alternatively, benchmarking analytics platform 112 may receive the data relating to the benchmarking task during the project. For example, when a project is ongoing, benchmarking analytics platform 112 may monitor an output of data sources 102 to obtain data regarding the project, and may determine to perform benchmarking or update benchmarking performed at a previous time. Additionally, or alternatively, benchmarking analytics platform 112 may receive data relating to the benchmarking task after the project. For example, after a project is completed, benchmarking analytics platform 112 may obtain data to provide a benchmarking analysis of the project (e.g., a resource utilization report, a resource savings from automation report, etc.).

As further shown in FIG. 1, and by reference number 140, benchmarking analytics platform 112 may perform the benchmarking task using the data, and may generate a recommendation relating to a result of performing the benchmarking task. For example, benchmarking analytics platform 112 may process the data to determine a resource utilization associated with completed tasks or portions of tasks of the project. In this case, benchmarking analytics platform 112 may use data relating to computing utilization, customer satisfaction, energy prices, employee salaries, and/or the like to determine a resource utilization for the completed tasks or portions of tasks of the project.

In some implementations, benchmarking analytics platform 112 may process the data to determine a baseline resource utilization associated with the completed tasks or portions of tasks of the project. For example, when a ticket resolution task is automated, benchmarking analytics platform 112 may use data relating to another project where a ticket resolution project was not automated to determine a baseline resource utilization for non-automated ticket resolution. In this way, benchmarking analytics platform 112 can determine a resource-utilization savings associated with automating the ticket resolution project. In contrast, when the ticket resolution task is manually completed, benchmarking analytics platform 112 may use data relating to another project where the ticket resolution project was automated to determine the baseline resource utilization for automated ticket resolution (e.g., to determine an excessive resource-utilization associated with not automating the ticket resolution project). In another example, benchmarking analytics platform 112 may determine a resource-utilization savings from switching to partial automation, such as switching from manual completion to use of reusable templates, methods, documents, or the like.

In some implementations, benchmarking analytics platform 112 may process the data to determine a projected resource utilization associated with a non-completed task. For example, benchmarking analytics platform 112 may determine a projected resource utilization for automating code testing and a projected resource utilization for manual code testing based on other projects for which code testing tasks were performed, based on computing efficiency of computing resources on which the code testing tasks are to be performed, based on a labor cost or a skill proficiency of employees that are to perform the code testing tasks manually, or the like. In this way, benchmarking analytics platform 112 may determine a projected resource-utilization savings associated with switching from manual completion of a task to automated completion of a task.

In some implementations, benchmarking analytics platform 112 may generate a recommendation relating to altering a task completion method. For example, benchmarking analytics platform 112 may determine that automation of a task is associated with a threshold resource utilization savings relative to manual completion of the task, and may generate a recommendation to use an automated service of project management platform 104 to complete the task. Additionally, or alternatively, benchmarking analytics platform 112 may generate a recommendation relating to training. For example, benchmarking analytics platform 112 may determine that a training program may improve manual completion of a task to reduce resource utilization relative to automatic completion of the task, and may generate a recommendation relating to providing the training program. Additionally, or alternatively, benchmarking analytics platform 112 may generate a recommendation relating to resource realignment. For example, benchmarking analytics platform 112 may determine that switching to automated completion of a task results in resources (e.g., computing resources, labor resources, financial resources, etc.) used for manual completion of the task being made available, and may provide a recommendation for another portion of the project to which to allocate the resources to improve completion of the other portion of the project. In this way, benchmarking analytics platform 112 may assist in automated project management.

As further shown in FIG. 1, and by reference number 150, benchmarking analytics platform 112 may provide information based on results of performing the benchmarking task.

For example, benchmarking analytics platform 112 may generate an analytics user interface, and may provide the analytics user interface for display via client device 120. In this case, the analytics user interface may include information identifying the recommendation, identifying a resource savings from automation, identifying a projected resource savings from additional automation, identifying compliance with a project budget or project timeline, identifying a predicted issue with compliance with a project budget or project timeline, or the like. In this way, benchmarking analytics platform 112 assists in management of a project. Additionally, or alternatively, benchmarking analytics platform 112 may provide an automation alteration instruction to project management platform 104, external tools 106, or the like. In this way, benchmarking analytics platform 112 may automatically cause a task to be automated (e.g., using project management platform 104) rather than completed manually (e.g., by a user using external tool 106).

Additionally, or alternatively, benchmarking analytics platform 112 may provide information for reporting and data storage. For example, benchmarking analytics platform 112 may store information identifying a resource utilization of a task for utilization in a subsequent benchmarking task, thereby reducing a utilization of computing resources to perform the subsequent benchmarking task relative to determining the resource utilization of the task from raw data. Additionally, or alternatively, benchmarking analytics platform 112 may generate a report regarding resource savings from automation, from an automation alteration, or the like, and may automatically communicate with one or more client devices 120 to provide the report for display, to schedule a meeting for discussion of the report among stakeholders, to generate a press release of the report, to generate a job listing for an employee to configure project management platform 104 for an automation task recommended in the report, to update a machine learning or data analytics algorithm, or the like.

In this way, benchmarking analytics platform 112 may automate assignment of tasks for manual completion or automated completion using project management platform 104 based on benchmarking, thereby reducing a utilization of computing resources relative to tasks being assigned to manual completion based on inaccurate, outdated, or incomplete knowledge of resource savings from automation.

As indicated above, FIG. 1 is provided merely as an example. Other examples are possible and may differ from what was described with regard to FIG. 1.

Figure 2A:
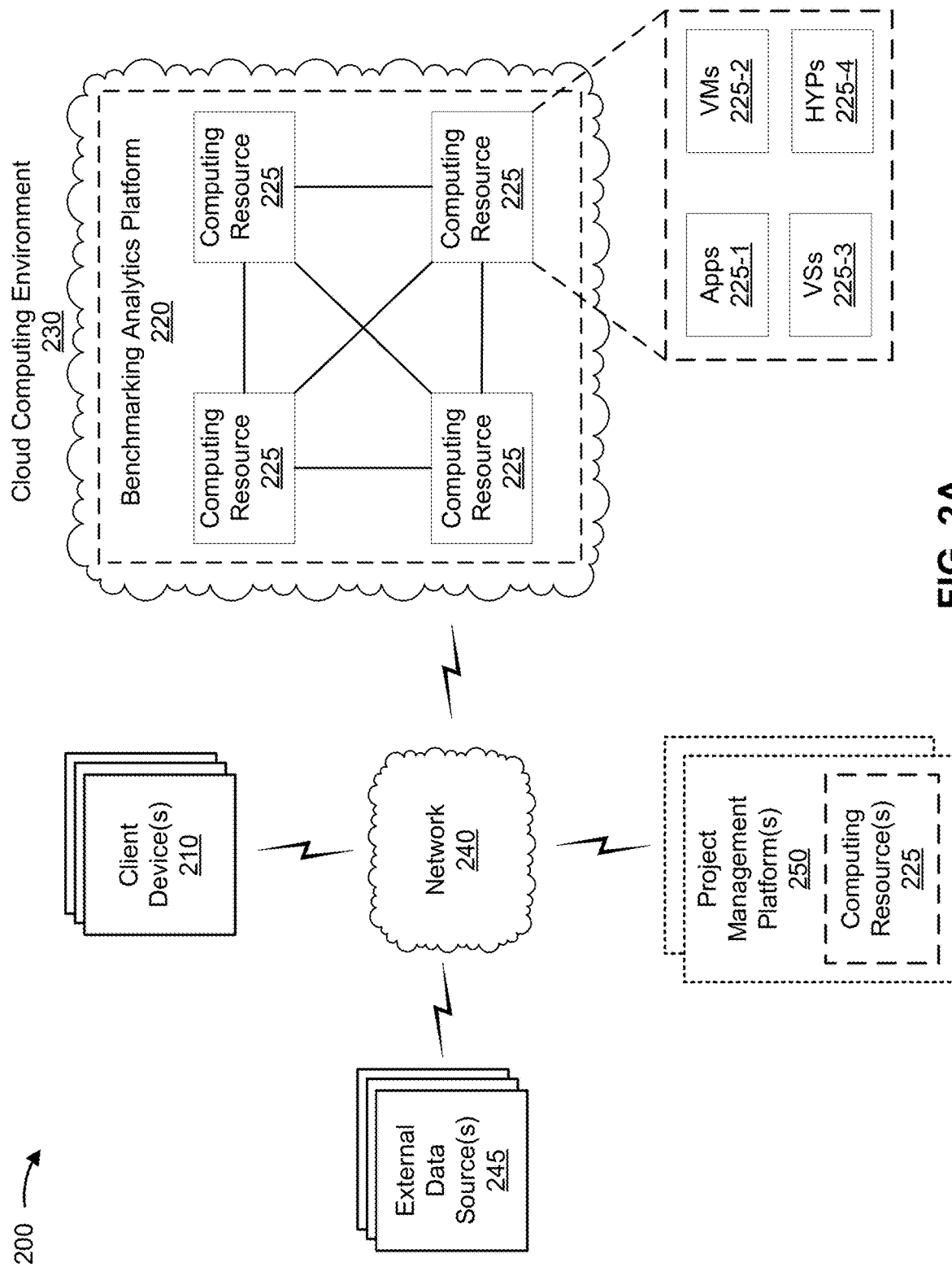
Figure 2C:
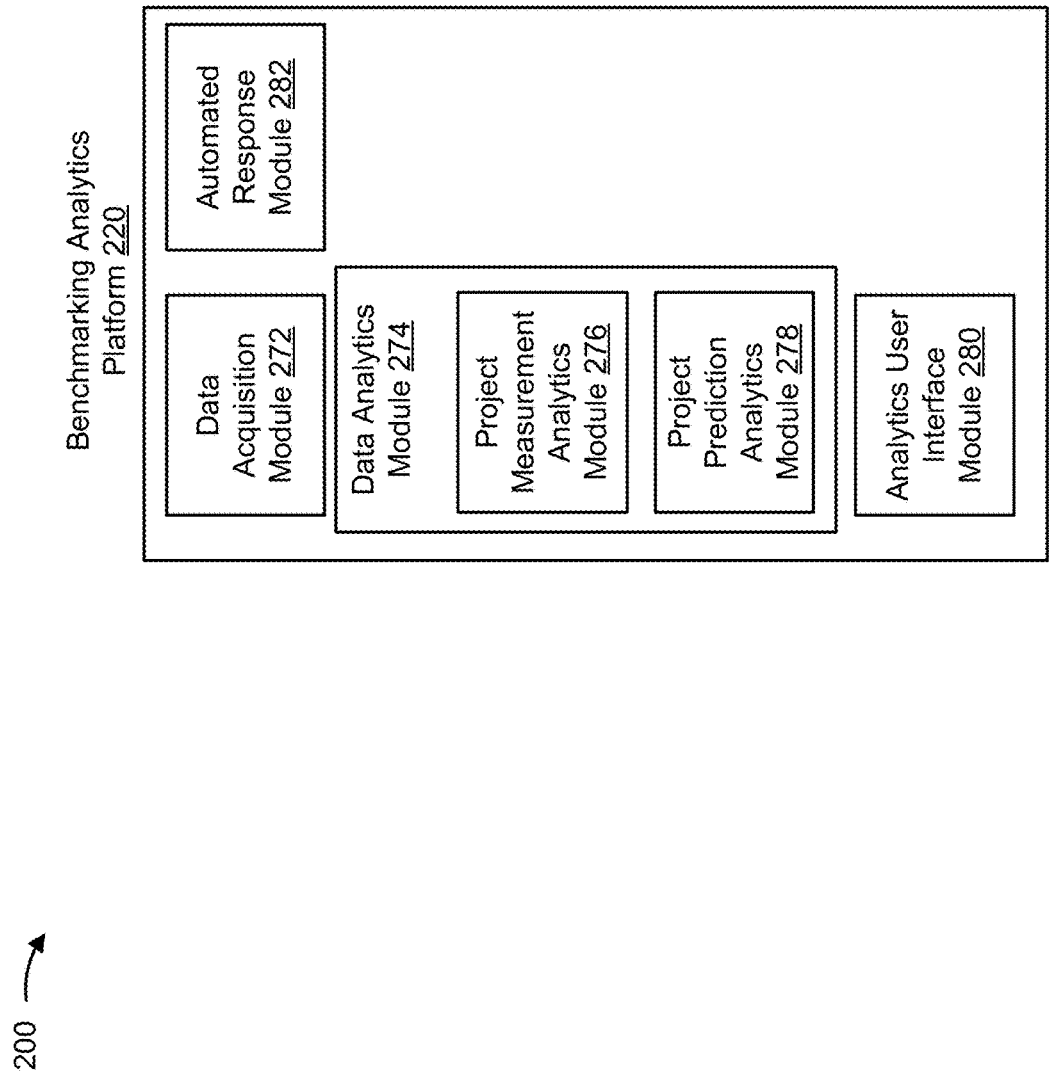

FIGS. 2A-2C are diagrams of an example environment 200 in which systems and/or methods, described herein, may be implemented. As shown in FIG. 2A, environment 200 may include one or more client device(s) 210, benchmarking analytics platform 220 hosted within cloud computing environment 230, network 240, one or more external data sources 245, and one or more project management platforms 250. Devices of environment 200 may interconnect via wired connections, wireless connections, or a combination of wired and wireless connections.

Client device 210 includes one or more devices capable of receiving, generating, storing, processing, and/or providing information associated with benchmarking a software development project. For example, client device 210 may include a communication and/or computing device, such as a mobile phone (e.g., a smart phone, a radiotelephone, etc.), a computer (e.g., a desktop computer, a laptop computer, a tablet computer, a handheld computer), a gaming device, a wearable communication device (e.g., a smart wristwatch, a pair of smart eyeglasses, etc.), or a similar type of device. In some implementations, client device 210 may provide, to benchmarking analytics platform 220, information associated with a software development project. Additionally, or alternatively, client device 210 may receive information associated with a software development project from benchmarking analytics platform 220. In some implementations, client device 210 corresponds to client device 120 shown in FIG. 1.

Benchmarking analytics platform 220 includes one or more devices capable of receiving, generating, storing, classifying, processing, and/or providing information associated with benchmarking a project (e.g., a software development project), as described elsewhere herein. For example, benchmarking analytics platform 220 may include a cloud server or a group of cloud servers. In some implementations, benchmarking analytics platform 220 may communicate with client device 210 to provide information associated with benchmarking a project, such as a report, a recommendation, or the like. Additionally, or alternatively, benchmarking analytics platform 220 may communicate with project management platform 250 and/or external data sources 245 to obtain project information (e.g., source code relating to a project, information identifying a set of tickets for resolution, etc.). In some implementations, benchmarking analytics platform 220 corresponds to benchmarking analytics platform 112 shown in FIG. 1.

In some implementations, as shown, benchmarking analytics platform 220 may be hosted in cloud computing environment 230. Notably, while implementations described herein describe benchmarking analytics platform 220 as being hosted in cloud computing environment 230, in some implementations, benchmarking analytics platform 220 may not be cloud-based (i.e., may be implemented outside of a cloud computing environment) or may be partially cloud-based. Although implementations are described herein as classifying and resolving issues relating to a project development environment, benchmarking analytics platform 220 may be utilized to classify and resolve issues relating to other environments, such as a corporate environment, a governmental environment, an educational environment, and/or the like.

Cloud computing environment 230 includes an environment that delivers computing as a service, whereby shared resources, services, etc. may be provided to host benchmarking analytics platform 220. In some implementations, a cloud computing environment 230 (e.g., a same cloud computing environment 230, another cloud computing environment 230, etc.) may host project management platform 250, an external data source 245, or the like. Cloud computing environment 230 may provide computation, software, data access, storage, and/or other services that do not require end-user knowledge of a physical location and configuration of a system and/or a device that delivers the services. As shown, cloud computing environment 230 may include a group of computing resources 225 (referred to collectively as "computing resources 225" and individually as "computing resource 225").

In some implementations, cloud computing environment 230 may include other cloud computing resources, such as R based statistical computing resources (e.g., an R based algorithm to compute a ticket inflow rate of tickets relating to project issues, and perform allocation of computing resources based on ticket inflow rate), Microsoft Azure based computing resources (e.g., an Azure based AI resource, such as Microsoft Cortana, an Azure based algorithm, such as an algorithm to determine service level agreement compliance rates—failing to satisfy a threshold may indicate that a project has an issue and may cause a ticket to be automatically generated for project management platform 250, and/or the like), Language Understanding Intelligent Service (LUIS) based computing resources (e.g., an AI resource for natural language processing), International Business Machines (IBM) Watson based computing resources (e.g., an AI resource to provide user interface functionalities, to perform natural language interfacing with users, to perform analytics, etc.), Google Analytics based computing resources (e.g., an AI resource to provide user interface functionalities, to perform analytics, etc.), and/or the like.

In some implementations, one or more cloud computing resources may be co-located in cloud computing environment 230. Additionally, or alternatively, one or more cloud computing resources may be hosted in another cloud computing environment that may communicate with cloud computing environment 230. In some implementations, cloud computing environment 230 may integrate multiple tools designed for different project aspects (e.g., R for statistical analysis, Azure for big data computing of millions of data points relating to a project, Watson for natural language interfacing with a user). In this way, cloud computing environment 230 may enable benchmarking analytics platform 220 to effectively and automatically provide recommendations relating to managing automation of project tasks, such as for a software development project performed by project management platform 250 (e.g., to manage ticket resolution for a project, provide recommendations regarding a project, test a project, develop a project, and/or the like), thereby improving accuracy of coding, causing a reduction of coding errors, and/or the like. Such improvements may result in reduction of computing resources expended to complete the project, computing resources utilized when executing software managed or designed during a project, computing resources utilized to provide ongoing maintenance on a project (e.g., ticket resolution, project updates, etc.), and/or the like. In some implementations, benchmarking analytics platform 220 and project management platform 250 may be implemented in a common computing platform.

Computing resource 225 includes one or more personal computers, workstation computers, server devices, or another type of computation and/or communication device. In some implementations, computing resource 225 may host benchmarking analytics platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with benchmarking analytics platform 220, project management platform 250, and/or any other software capable of being provided via cloud computing environment 230. In some implementations, one application 225-1 may send/ receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

External data source 245 includes a computing platform, such as another cloud computing environment 230, a non-cloud computing based computing platform, and/or the like that provides data. For example, external data source 245 may include a server providing data regarding a ticket tracking tool, a defect management tool, an agile workflow tool, an artificial intelligence (AI) tool, a machine learning tool, an analytics tool, and/or the like. Additionally, or alternatively, external data source 245 may include a data structure providing information regarding other projects, such as data identifying a resource utilization associated with automated task completion or manual task completion for another project. In some implementations, external data source 245 may operate on client device 210. For example, client device 210 may include one or more tools that execute on client device 210, which may provide computing resources 225 for the one or more tools and which may provide data regarding execution of the one or more tools and/or utilization of client device 210. In some implementations, external data source 245 corresponds to external tools 106, data repositories 108, or the like shown in FIG. 1.

Project management platform 250 includes one or more devices capable of receiving, generating, storing, classifying, processing, and/or providing information associated with a project (e.g., a software development project), as described elsewhere herein. For example, project management platform 250 may include a cloud server or a group of cloud servers to perform a development operation, a maintenance operation, a testing operation, a management operation, or the like for a project based on a project plan (e.g., an assignment of the project management platform 250 to perform operations for one or more tasks of a project). In some implementations, project management platform 250 may communicate with client device 210 to obtain project information (e.g., source code relating to a project). Additionally, or alternatively, project management platform 250 may communicate with project management platform 250 to provide information to and/or obtain information from a tool operated by project management platform 250 (e.g., an artificial intelligence tool, another project management tool not co-located with project management platform 250, etc.). In some implementations, project management platform 250 corresponds to project management platform 104 shown in FIG. 1.

In some implementations, as shown, project management platform 250 may be hosted in cloud computing environment 230. Notably, while implementations described herein describe project management platform 250 as being hosted in cloud computing environment 230, in some implementations, project management platform 250 may not be cloud-based (i.e., may be implemented outside of a cloud computing environment) or may be partially cloud-based. Although implementations are described herein as classifying and resolving issues relating to a project development environment, project management platform 250 may be utilized to classify and resolve issues relating to other environments, such as a corporate environment, a governmental environment, an educational environment, and/or the like.

As shown in FIG. 2B, project management platform 250 includes an automation user interface module 252, an automation applications module 254, a delivery tools module 256, an adaptation module 258, a command center user interface module 260, and a data collection module 262.

Automation user interface module 252 is implemented using one or more computing resources (e.g., processing resources, memory resources, or the like) and is associated with providing a user interface relating to automating tasks of a software development project. In some implementations, automation user interface module 252 provides a user interface identifying a set of recommendations, such as recommendations received based on a result of a benchmarking by benchmarking analytics platform 220. For example, automation user interface module 252 may provide information identifying a recommended automation application, such as an automated delivery tool, and automated ticket resolution tool, or the like.

Automation applications module 254 is implemented using one or more computing resources (e.g., processing resources, memory resources, or the like) and is associated with providing one or more automated task completion project management tools. For example, based on a recommendation from benchmarking analytics platform 220, automation applications module 254 may execute an automated delivery tool, an automated code testing application, an automated ticket resolution tool, an automated work tracking tool, an automated report generation tool, and automated compliance tool, or the like.

Delivery tools module 256 is implemented using one or more computing resources (e.g., processing resources, memory resources, or the like) and is associated with providing one or more manual task completion project management tools. For example, delivery tools module 256 may provide a tool to support delivery by a developer, and may generate analytics regarding usage of the tool to support benchmarking of a task completed by the developer. In this case, delivery tools module 256 may store transactional data regarding data interactions with other portions of project management platform 250 or non-transactional data regarding user utilization of a tool, such as time expended, computing resources utilized, errors, or the like. In some implementations, delivery tools module 256 may integrate external tools into project management platform 250 for utilization by a user of project management platform 250.

Adaptation module 258 is implemented using one or more computing resources (e.g., processing resources, memory resources, or the like) and is associated with adapting between a data format of project management platform 250 and one or more other data formats used by one or more external tools. For example, adaptation module 258 may generate an adaptation tool for an external tool, and may utilize the adaptation tool to communicate with, to control, or the like the external tool. In this case, the adaptation tool may perform one or more data format translations, data packaging operations, application programming interface (API) calls, or the like to enable project management platform 250 to communicate with, to control, or the like the external tool.

Command center user interface module 260 is implemented using one or more computing resources (e.g., processing resources, memory resources, or the like) and is associated with managing other modules of project management platform 250. For example, command center user interface module 260 may provide a user interface for display via client device 210 to permit a user of client device 210 to access functionalities of project management platform 250. In some implementations, when benchmarking analytics platform 220 is integrated into project management platform 250, command center user interface module 260 may integrate reports regarding benchmarking of a project into a unified user interface with other aspects of project management platform 250, such as applications for use, real-time reporting of project status, or the like.

Data collection module 262 is implemented using one or more computing resources (e.g., processing resources, memory resources, or the like) and is associated with collecting, consolidating, and providing data for project management platform 250. For example, data collection module 262 may monitor operation of other modules, and may collect data and provide the data to benchmarking analytics platform 220. In some implementations, data collection module 262 may monitor client device 210 to obtain data regarding a project. For example, when client device 210 is being used to access tools operating on project management platform 250, data collection module 262 may obtain data regarding usage of client device 210 (e.g., keystrokes, time, computing resource usage, etc.), and may report the data to benchmarking analytics platform 220.

As shown in FIG. 2C, benchmarking analytics platform 220 may include data acquisition module 272; data analytics module 274, which may include project measurement analytics module 276 and project prediction analytics module 278; analytics user interface module 280; and automated response module 282.

Data acquisition module 272 is implemented using one or more computing resources (e.g., processing resources, memory resources, or the like) and is associated with obtaining data for benchmarking a project. For example, data acquisition module 272 may communicate with project management platform 250 to obtain data regarding utilization of project management platform 250 to complete one or more tasks of a project. Additionally, or alternatively, data acquisition module 272 may communicate with external data sources 245 to obtain data relating to the project. For example, data acquisition module 272 may obtain stored data relating to other, similar projects, and may use the stored data to predict a resource utilization for a task of the project. In this case, data acquisition module 272 may determine that another project is similar to a project based on a common characteristic, such as a common project type, a common project task, a common company type, a common company size, a company of the project and the other project being on a common list (e.g., a publically available list, a privately available list, etc.), or the like. In some implementations, data acquisition module 272 may determine a similarity score between the company and the other company, and may determine to use data regarding the other project based on the similarity score satisfying a threshold. In this way, data acquisition module 272 may reduce data for processing to benchmark the project relative to benchmarking the project using data regarding all other projects.

Data analytics module 274 is implemented using one or more computing resources (e.g., processing resources, memory resources, or the like) and is associated with performing a benchmarking task for a project. For example, data analytics module 274 may utilize project measurement analytics module 276 to benchmark one or more tasks that have been performed and for which measurement data is available. In this case, when, for example, data analytics module 274 obtains data regarding a quantity of time spent testing code for errors, data analytics module 274 may determine a utilization of computing resources, energy resources, or the like for the testing based on the quantity of time, based on information identifying resource utilizations for other projects as a function of time, or the like. Similarly, data analytics module 274 may utilize project prediction analytics module 278 to obtain benchmarking for one or more project tasks that have not been performed or for which measurement data is not available. For example, before tasks are assigned for manual or automatic completion for a project, project prediction analytics module 278 may predict a resource utilization for the tasks based on resource utilization for similar tasks for other projects, a task difficulty determination, or the like. Additionally, or alternatively, when a task is manually performed and data is not measured for the task, project prediction analytics module 278 may predict a resource utilization (e.g., a computing resource, processing resource, memory resource, energy resource, monetary resource, labor resource, or the like utilization) for the manually performed task based on other similar manually performed tasks, based a response to providing a user interface questionnaire to a user who performed the manually performed task via client device 210, or the like.

Analytics user interface module 280 is implemented using one or more computing resources (e.g., processing resources, memory resources, or the like) and is associated with providing a user interface identifying results of performing a benchmarking task. For example, analytics user interface module 280 may provide information identifying a resource utilization for a project, a resource savings from automation for the project, a predicted resource savings from selecting automation for tasks of the project, a recommendation relating to automation for the project, or the like.

Automated response module 282 is implemented using one or more computing resources (e.g., processing resources, memory resources, or the like) and is associated with generating a set of recommendations relating to results of performing a benchmarking task, and automatically performing one or more response actions based on the set of recommendations. For example, automated response module 282 may recommend that a particular task of a project be automated based on a predicted threshold resource utilization savings, and may automatically communicate with project management platform 250 to cause the particular task to be automated. Similarly, automated response module 282 may automatically assign, to a developer, a task of provisioning project management platform 250 for performing an automated task. Similarly, automated response module 282 may cause computing resources to be allocated for performing an automated task, establishing a meeting to discuss automating a task by stakeholders in a project, generating a notification regarding task automation to be provided, generating a job application for a developer to reconfigure project management platform 250 to automate a task to be posted, identifying a candidate for a job based on using machine learning to parse natural language resumes, and/or the like.

The number and arrangement of devices, modules, and/or networks shown in FIGS. 2A-2C are provided as an example. In practice, there may be additional devices, modules, and/or networks; fewer devices, modules, and/or networks; different devices, modules, and/or networks; or differently arranged devices, modules, and/or networks than those shown in FIGS. 2A-2C. Furthermore, two or more devices and/or modules shown in FIGS. 2A-2C may be implemented within a single device and/or module, or a single device and/or module shown in FIGS. 2A-2C may be implemented as multiple, distributed device and/or modules. Additionally, or alternatively, a set of devices (e.g., one or more devices) and/or modules (e.g., one or more modules) of environment 200 may perform one or more functions described as being performed by another set of devices and/or modules of environment 200.

Figure 3:
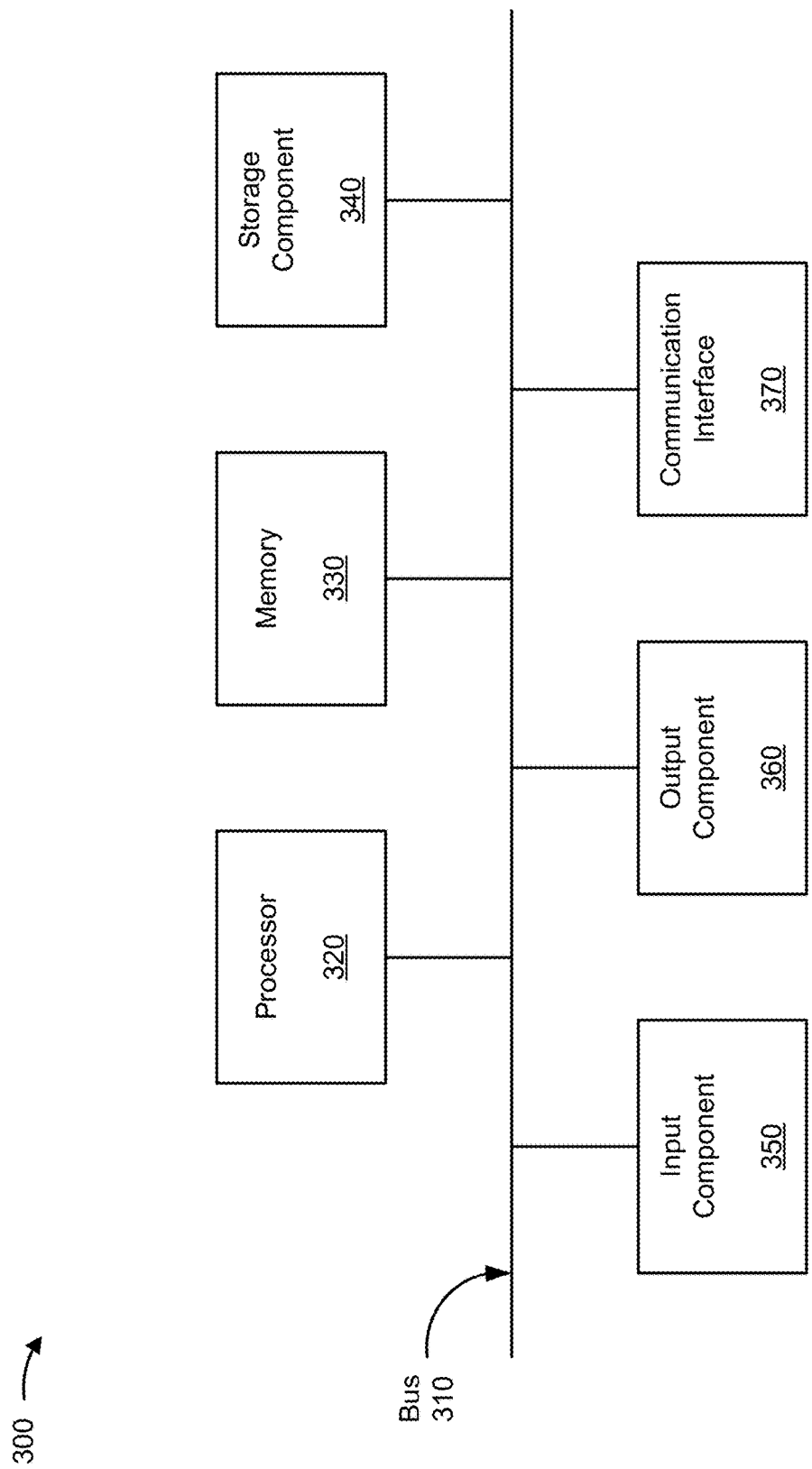
FIG. 3 is a diagram of example components of one or more devices of FIG. 2.

FIG. 3 is a diagram of example components of a device 300. Device 300 may correspond to client device 210, benchmarking analytics platform 220, external data sources 245 and/or project management platform 250. In some implementations, client device 210, benchmarking analytics platform 220, external data sources 245, and/or project management platform 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for benchmarking for automated task management. In some implementations, one or more process blocks of FIG. 4 may be performed by benchmarking analytics platform 220. In some implementations, one or more process blocks of FIG. 4 may be performed by another device or a group of devices separate from or including benchmarking analytics platform 220, such as client device 210, external data source 245, and/or project management platform 250.

As shown in FIG. 4, process 400 may include detecting a trigger to perform a benchmarking task (block 410). For example, benchmarking analytics platform 220 may detect the trigger to perform the benchmarking task. In some implementations, benchmarking analytics platform 220 may perform the benchmarking task based on a request. For example, benchmarking analytics platform 220 may provide a user interface for display via client device 210, and may receive a request to perform the benchmarking task based on detecting a user interaction with the user interface. In some implementations, benchmarking analytics platform 220 may automatically determine to perform the benchmarking task. For example, benchmarking analytics platform 220 may detect that a new project is created in project management platform 250 (e.g., based on receiving an indication from project management platform 250, based on monitoring project management platform 250, etc.), and may determine to perform the benchmarking task to identify whether to assign a task of the new project for manual completion or automatic completion.

Additionally, or alternatively, benchmarking analytics platform 220 may monitor data events associated with project management platform 250 to determine to perform benchmarking for an ongoing project. For example, based on determining that a threshold quantity of tickets being is received for resolution during a particular period of time, benchmarking analytics platform 220 may determine to benchmark the project to determine whether a ticket resolution task is to be altered from manual resolution to automatic resolution. Additionally, or alternatively, benchmarking analytics platform 220 may determine that a project is completed, and may determine to perform the benchmarking task to provide reporting relating to the project. For example, after the project is completed, benchmarking analytics platform 220 may be triggered to perform the benchmarking analytics task and generate a report identifying a resource utilization and/or a resource savings associated with automated task completion in the project.

In this way, benchmarking analytics platform 220 detects the trigger to perform the benchmarking task.

As further shown in FIG. 4, process 400 may include determining project data relating to a project platform based on detecting the trigger to perform the benchmarking task (block 420). For example, benchmarking analytics platform 220 may determine the project data based on detecting the trigger. In some implementations, benchmarking analytics platform 220 may obtain project data from project management platform 250. For example, benchmarking analytics platform 220 may obtain project data identifying a utilization of project management platform 250 (e.g., applications utilized, automated tasks completed, manually completed tasks using tools of project management platform 250, computing resource utilization, or the like), project data relating to completion of the project (e.g., tasks completed, tickets resolved, ticket resolution cycle times, code accuracy, labor costs, etc.), and/or the like. In some implementations, benchmarking analytics platform 220 may obtain project data from external data sources 245. For example, benchmarking analytics platform 220 may obtain data identifying other projects and/or project data thereof (e.g., resource utilization for tasks relating to other projects), data identifying utilization of tools not co-located with project management platform 250 in a cloud computing environment 230, or the like.

In some implementations, benchmarking analytics platform 220 may obtain particular types of data. For example, benchmarking analytics platform 220 may obtain transactional data, ordering data, log file data, product classification data, task classification data, user skill proficiency data, human resources data, company data, energy price data, computing resource price data, and/or the like. For example, benchmarking analytics platform 220 may access an online repository storing data regarding a task, a project, an application, a market, and/or the like, and may obtain data from the online repository. Additionally, or alternatively, benchmarking analytics platform 220 may monitor utilization of a form (e.g., a software development coding tracking form, a time sheet, and/or the like) to obtain data regarding the utilization of the form or data entered into the form. Similarly, benchmarking analytics platform 220 may use a data acquisition agent installed on another system (e.g., client device 210) to passively collect data regarding the other system for use in benchmarking, a user interface monitoring agent installed to passively collect data regarding utilization of a user interface (e.g., to infer resource utilization by another system generating the user interface or providing data to populate the user interface), or the like. In this way, benchmarking analytics platform 220 may determine resource utilizations and resource costs associated with each completed task of the project.

In some implementations, benchmarking analytics platform 220 may provide a user interface to client device 210 to permit a user to specify project data. Additionally, or alternatively, benchmarking analytics platform 220 may process a document (e.g., a design document, a requirements document, etc.) using natural language processing (NLP), machine learning (ML), artificial intelligence (AI), and/or the like, to extract project data. Additionally, or alternatively, benchmarking analytics platform 220 may crawl the web, perform API calls, identify similar projects, and/or the like to obtain data regarding similar projects. In some implementations, benchmarking analytics platform 220 may classify another project as similar to a project based on a type of client, a size of a client, an industry of a client, a set of requirements, and/or the like.

In some implementations, benchmarking analytics platform 220 may process project data to determine a type of a project or classify the project. For example, benchmarking analytics platform 220 may use analytics tools (e.g., a rules engine, a cognitive computing engine, etc.) trained on a training set of data regarding projects to analyze the project and a group of other projects, generate a score for the group of other projects representing a similarity to the project, and select one or more projects with a threshold score as similar projects. In some implementations, benchmarking analytics platform 220 may classify a project as a similar project based on geography, industry, technology, a combination thereof, etc. In this case, benchmarking analytics platform 220 may select data relating to similar projects, similar companies, similar clients, or the like for benchmarking a task of a project that is selected for benchmarking. In some implementations, benchmarking analytics platform 220 may determine rules for a rules engine based on a delivery type (e.g., agile delivery, application delivery, application maintenance, factory management, etc.), based on a rubric for the delivery type, and/or the like. In some implementations, benchmarking analytics platform 220 may analyze thousands, hundreds of thousands, and/or the like of prior projects to train a cognitive computing engine (e.g., using one or more big data techniques).

In this way, benchmarking analytics platform 220 determines project data relating to a project platform based on detecting the trigger to perform the benchmarking task As further shown in FIG. 4, process 400 may include processing the project data relating to the project platform to benchmark the project (block 430). For example, benchmarking analytics platform 220 may process the project data to benchmark the project. In some implementations, benchmarking analytics platform 220 may determine a measured utilization of project management platform 250 to complete a task associated with the project. For example, benchmarking analytics platform 220 may determine a computing resource utilization, a cost, and/or the like associated with automated completion of the task using project management platform 250, manual completion of the task using project management platform 250, semi-automated completion of the task (e.g., using a form, a reusable template, etc.), or the like. In some implementations, benchmarking analytics platform 220 may determine a resource savings from cost avoidance (e.g., from avoidance of revising coding errors, avoidance of missed deadlines, avoidance of escalating tickets to another developer using another computing system, avoidance of a project bottleneck or failure point, avoidance of poor network performance, avoidance of poor website performance, avoidance of lost customers, etc.).

In some implementations, benchmarking analytics platform 220 may determine a predicted utilization of resources to complete the task. For example, benchmarking analytics platform 220 may determine a predicted utilization of resources of project management platform 250 to complete the task, utilization of another computing resource to complete the task, manual effort to complete the task, cost to complete the task, and/or the like based on information relating to one or more similar tasks, projects, clients, and/or companies. In some implementations, benchmarking analytics platform 220 may compare a project to another project. For example, benchmarking analytics platform 220 may identify one or more client deals relating to using project management platform 250 to perform tasks, may compare benchmarking analysis for the one or more client deals to a proposed client deal for the project to determine a benchmarking for the proposed client deal. In this case, project management platform 250 may generate a recommendation relating to altering the proposed client deal (e.g., to match a client deal, of the one or more client deals, that is associated with resource utilization savings relative to the proposed client deal).

In some implementations, benchmarking analytics platform 220 may process the project data using an algorithm. For example, benchmarking analytics platform 220 may select an algorithm for determining a resource utilization based on a type of task, a type of project, a type of completion method (e.g., automated or manual), or the like, benchmarking analytics platform 220 may select a particular type of algorithm to determine the resource utilization. In some implementations, benchmarking analytics platform 220 may configure the algorithm. For example, benchmarking analytics platform 220 may configure an algorithm for predicting resource utilization in a project based on measured resource utilization in past projects. In some implementations, benchmarking analytics platform 220 may store the configured algorithm for utilization in another benchmarking task, thereby reducing a resource utilization relative to reconfiguring the algorithm for each benchmarking task.

In some implementations, benchmarking analytics platform 220 may provide data (e.g., ticket assignment application usage statistics, manual ticket assignment measurement data, ticket complexity data, ticket priority data, etc.) to a computing resource, may allocate computing resources to implement the computing resource to perform the benchmarking. For example, based on providing a threshold size data set of project data (e.g., millions of data points, billions of data points, etc.) to a module for processing, benchmarking analytics platform 220 may dynamically reallocate computing resources (e.g., processing resources or memory resources) to increase/decrease a resource allocation to the module to facilitate the processing of the threshold size data set, and/or the like. In this way, resource allocation for benchmarking analytics platform 220 better matches a task that is being performed, enabling more efficient resource allocation, while freeing up resources for other processing tasks when not needed. In this way, processing tasks are completed faster, and less memory is needed based on dynamically reallocating memory relative to a static allocation of resources for project management. In some implementations, benchmarking analytics platform 220 may process the data using machine learning, artificial intelligence, heuristics, natural language processing, or another big data technique.

Additionally, or alternatively, benchmarking analytics platform 220 may cause data to be provided for display via client device 210 to obtain user input (e.g., a user recommendation, a user input of a benchmarking prediction or result, etc.). In this way, benchmarking analytics platform 220 learns to benchmark tasks faster than with only automation, trains artificial intelligence faster (e.g., an artificial intelligence integration learns from human resolutions), and allows a user to see errors in artificial intelligence based benchmarking and override an artificial intelligence resource (e.g., which avoids errors to critical calculations). For example, based on determining a score relating to processing data (e.g., a confidence metric for a resource utilization that is determined), and determining that score does not satisfy a threshold, benchmarking analytics platform 220 may provide information for display via a user interface of client device 210 to request user assistance in determining the resource utilization (e.g., benchmarking analytics platform 220 may ask a user to manually input a set of timesheets identifying time spent resolving a ticket), thereby improving benchmarking using human-artificial intelligence interaction relative to another technique using only human or only artificial intelligence based benchmarking.

In this way, benchmarking analytics platform 220 processes the project data relating to the project platform to benchmark the project.

As further shown in FIG. 4, process 400 may include generating a recommendation based on the benchmarking of the project (block 440). For example, benchmarking analytics platform 220 may generate the recommendation based on the benchmarking of the project. The recommendation may indicate one or more response actions to be performed to reduce utilization of the resources (e.g., computing resources, energy resources, cost resources, etc.) in an ongoing or new project. For example, benchmarking analytics platform 220 may determine a recommendation relating to automating a ticket resolution task to reduce computing utilization relative to manual performance of the ticket resolution task based on benchmarking results identifying a predicted cost of automated resolution and a measured cost of manual resolution. In some implementations, benchmarking analytics platform 220 may determine a recommendation relating to when to implement the recommendation. For example, benchmarking analytics platform 220 may determine that the ticket resolution task is to be switched from manual resolution to automated resolution when a ticket inflow rate satisfies a threshold.

In some implementations, the recommendation may include information identifying one or more applications of project management platform 250. For example, benchmarking analytics platform 220 may determine a threshold resource utilization savings associated with selecting a delivery tool of project management platform 250 to manage delivery of a software development project based on benchmarking identifying a predicted cost of project delivery using another tool not co-located with project management platform 250 compared with a tool of project management platform 250. Similarly, the recommendation may include information indicating that another tool is to be integrated into project management platform 250 using a tool integration or adaptation functionality to permit project management platform 250 to automatically operate the tool, thereby reducing a resource utilization.

In some implementations, benchmarking analytics platform 220 may determine a recommendation for a subsequent project or another concurrent project. For example, benchmarking analytics platform 220 may determine a cost savings associated with automating a task of the project, and may provide a recommendation for changing another project to automate the task or for subsequent projects to be initiated with the task being automated.

In some implementations, benchmarking analytics platform 220 may determine the recommendation based on using a machine learning technique. For example, benchmarking analytics platform 220 may monitor projects (e.g., monitor project completion, project management platform 250 utilization, or the like) to determine changes manually made to the projects based on reporting of benchmarking results, and may store information identifying the changes for use in subsequent recommendations. In this case, benchmarking analytics platform 220 may determine that after a threshold cost savings is determined for automating a task, a meeting was manually scheduled to discuss automating the task, and benchmarking analytics platform 220 may determine to schedule meetings when the threshold cost savings is subsequently determined.

In this way, benchmarking analytics platform 220 generates a recommendation based on the benchmarking of the project.

As further shown in FIG. 4, process 400 may include performing a response action based on the recommendation (block 450). For example, benchmarking analytics platform 220 may perform the response action based on the recommendation. In some implementations, benchmarking analytics platform 220 may provide the recommendation for display as a response action based on generating the recommendation. For example, benchmarking analytics platform 220 may alter a user interface provided via client device 210 to cause the user interface to include the recommendation. In some implementations, benchmarking analytics platform 220 may automatically implement the recommendation. For example, benchmarking analytics platform 220 may communicate with external data sources 245, project management platform 250, client device 210, or the like to cause a task to be automatically completed, to cause a task to be manually completed, or the like. In this way, benchmarking analytics platform 220 automatically reduces a utilization of resources relating to task completion based on performing benchmarking.

A response action may include providing an alert; generating a calendar event (e.g., for a meeting relating to a recommendation); assigning a task to a developer for manual completion or to cause the developer to provision project management platform 250 for automatic completion of the task; assigning developers to a shift; causing project management platform 250 to perform a task, such as tool adaptation or the like; altering a resource selected for a project (e.g., switching an artificial intelligence resource from a first artificial intelligence resource, such as Google Analytics, to a second artificial intelligence resource, such as Cortana to reduce a resource utilization); causing project management platform 250 to generate program code to automate a task or to complete a software development task (e.g., using a code generation tool, based on obtaining code from a similar project with a similar functionality—authentication code to include authentication in software); providing information in a user interface (e.g., generate the user interface, include information in the user interface, such as a query from a virtual agent, a response from a virtual agent, etc. based on an artificial intelligence technique being used); providing a report (e.g., identifying a resource savings for each task and/or each automation application available for each task, summary information for a project, team-specific resource savings data, user-specific resource savings data, or the like) identifying a resource utilization savings; and/or the like.

In this way, benchmarking analytics platform 220 performs a response action based on the recommendation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, benchmarking analytics platform 220 determines a resource utilization associated with a task of a project, and performs a response action to reduce the resource utilization for the task, identify a resource utilization savings from automating the task, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
monitor, using a data acquisition agent or a user interface monitoring agent installed on another system, utilization of a project platform associated with a first project,
the utilization of the project platform including monitoring one or more of a computing resource, a processing resource, or a memory resource;
obtain, based on the monitoring, data associated with utilization of an interface of the other system;
detect a trigger to perform a benchmarking task based on the data associated with utilization of the interface of the other system,
the trigger being associated with a threshold quantity of tickets, associated with issues related to the first project, being received during a particular period of time,
the benchmarking task including a first benchmarking of a first resource utilization associated with one or more tasks completed via an automated procedure,
the first benchmarking being based on a first baseline that is determined based on data associated with a second project that was not automated, and
the benchmarking task including a second benchmarking of a second resource utilization associated with the one or more tasks completed via a manual procedure,
the second benchmarking being based on a second baseline that is determined based on data associated with a third project that was automated;
determine project data relating to the project platform based on detecting the trigger to perform the benchmarking task;
process the project data relating to the project platform to benchmark the first project,
the project data being processed regarding one or more other tasks of one or more other projects, including at least the second project and the third project, to predict the first resource utilization and the second resource utilization associated with the one or more tasks, and
the project data being processed using a particular type of algorithm,
the particular type of algorithm being selected based on at least one of a type of task, a type of project, or a type of completion method, and
the particular type of algorithm being a configured algorithm,
the configured algorithm being stored for utilization in another benchmarking task;
determine, based on processing the project data, a projected utilization savings associated with switching from completing the one or more tasks using the manual procedure to the automated procedure;
determine that the automated procedure is associated with a threshold value related to the projected utilization savings;
generate, based on determining that the automated procedure is associated with the threshold value, a recommendation relating to completion of the one or more tasks using the automated procedure or the manual procedure;
automatically switch, based on the recommendation being related to completion of the tasks using the automated procedure, an artificial intelligence resource from a first artificial intelligence resource to a second artificial intelligence resource; and
cause, based on the recommendation, the device to generate program code to automate the one or more tasks or to complete a software development task.

2. The device of claim 1, where the one or more processors are configured to:
communicate with one or more other devices to cause a user interface to be provided for display,
the user interface including information identifying the first resource utilization and the second resource utilization.

3. The device of claim 1, where the one or more processors, when generating the recommendation, are configured to:
identify an application of the project platform associated with enabling completion of the one or more tasks; and where the one or more processors are further to:
communicate with one or more other devices to provide information identifying the application.

4. The device of claim 1, where the project platform is usable to perform at least one of:
a development operation for the first project,
a maintenance operation for the first project,
a testing operation for the first project, or
a management operation for the first project.

5. The device of claim 1, where the one or more processors, when processing the project data, are configured to:
perform the first benchmarking; and
perform the second benchmarking.

6. The device of claim 1, where at least one of the first benchmarking or the second benchmarking includes determining the first resource utilization or the second resource utilization using measurement data of the project data.

7. A method, comprising:
monitoring, by a computing resource in a cloud computing environment and using a data acquisition agent or a user interface monitoring agent installed on another system, utilization of a project platform associated with a first project,
the utilization of the project platform including monitoring one or more of a processing resource, a memory resource, an energy resource, a monetary resource, or a labor resource;
obtaining, by the computing resource and based on the monitoring, data associated with utilization of an interface of the other system;
detecting, by the computing resource and based on the data associated with utilization of the interface of the other system, a trigger to perform a benchmarking task,
the trigger being associated with a threshold quantity of tickets, associated with issues related to the first project, being received during a particular period of time,
the benchmarking task including a first benchmarking of a first resource utilization associated with one or more tasks completed via an automated procedure,
the first benchmarking being based on a first baseline that is determined based on data associated with a second project that was not automated, and
the benchmarking task including a second benchmarking of a second resource utilization associated with the one or more tasks completed via a manual procedure,
the second benchmarking being based on a second baseline that is determined based on data associated with a third project that was automated;
determining, by the computing resource, project data relating to the project platform based on detecting the trigger to perform the benchmarking task;
processing, by the computing resource, the project data relating to the project platform to benchmark the first project,
the benchmarking of the first project to include information identifying a resource utilization savings of automating a task using the project platform relative to manual completion of the task,
the task being a software development task,
the project data being processed to predict a resource utilization associated with the task, and
the project data being processed using a particular type of algorithm,
the particular type of algorithm being selected based on at least one of a type of the task, a type of the first project, or a type of completion method, and
the particular type of algorithm being a configured algorithm,
the configured algorithm being stored for utilization in another benchmarking task;
determining, by the computing resource and based on processing the project data, a projected utilization savings associated with switching from the manual completion of the task to automating the task;
determining, by the computing resource, that automating the task is associated with a threshold value related to the projected utilization savings;
generating, by the computing resource and based on determining that automating the task is associated with the threshold value, a recommendation associated with automating the task using the project platform;
automatically switching, by the computing resource and based on the recommendation including a determination to automate the task, an artificial intelligence resource from a first artificial intelligence resource to a second artificial intelligence resource; and
causing, by the computing resource and based on the recommendation, the computing resource to generate program code to automate the task or to complete the task.

8. The method of claim 7, further comprising:
altering a project plan to cause the task to be automated using the project platform.

9. The method of claim 7, where the benchmarking of the first project further comprises:
calculating the resource utilization for at least one of:
the processing resource,
the memory resource,
the energy resource,
the monetary resource, or
the labor resource.

10. The method of claim 7, further comprising:
monitoring completion of the first project to obtain the project data relating to the project platform.

11. The method of claim 7, where the resource utilization savings comprises at least one of:
a measured resource utilization savings, or
a predicted resource utilization savings.

12. The method of claim 7, further comprising:
providing the recommendation indicating whether the task is to be completed using a manual procedure or an automated procedure based on the projected utilization savings.

13. A non-transitory computer-readable medium storing instructions, the instructions comprising:
one or more instructions that, when executed by one or more processors, cause the one or more processors to:
monitor, using a data acquisition agent or a user interface monitoring agent installed on another system, utilization of a project platform associated with a first project,
the utilization of the project platform including monitoring one or more of a computing resource, a processing resource, or a memory resource;
obtain, based on the monitoring, data associated with utilization of an interface of the other system;
detect, based on the data associated with utilization of the interface of the other system, a trigger to perform a benchmarking task for the first project, the trigger being associated with a threshold quantity of tickets, associated with issues related to the first project, being received during a particular period of time, the benchmarking task including a first benchmarking of a first resource utilization associated with one or more tasks completed via an automated procedure, the first benchmarking being based on a first baseline that is determined based on data associated with a second project that was not automated, and the benchmarking task including a second benchmarking of a second resource utilization associated with the one or more tasks completed via a manual procedure, the second benchmarking being based on a second baseline that is determined based on data associated with a third project that was automated, and the project platform being a cloud computing environment implemented project management platform providing a plurality of project management tools;

process project data relating to the project platform to benchmark the first project for at least one of the plurality of project management tools, the project data being processed to predict resource utilization associated with one or more tasks, and the project data being processed using a particular type of algorithm, the particular type of algorithm being selected based on one or more of a type of task of the one or more tasks, a type of the first project, or a type of completion method, and the particular type of algorithm being a configured algorithm, the configured algorithm being stored for utilization in another benchmarking task;

determine, based on processing the project data, a projected utilization savings associated with switching from manual completion of the one or more tasks to automating the one or more tasks;

determine that the automating the one or more tasks is associated with a threshold value related to the projected utilization savings;

generate, based on determining that the automating the one or more tasks is associated with a threshold value related to the projected utilization savings, a recommendation relating to completion of the one or more tasks using the at least one of the plurality of project management tools;

automatically switch, based on the recommendation relating to completion of the one or more tasks using an automated procedure, an artificial intelligence resource from a first artificial intelligence resource to a second artificial intelligence resource; and cause, based on the recommendation, program code to be generated to automate the one or more tasks or to complete a software development task.

14. The non-transitory computer-readable medium of claim 13, where the one or more instructions, when executed by the one or more processors, further cause the one or more processors to:
provide information identifying the recommendation.

15. The non-transitory computer-readable medium of claim 13, where the one or more instructions, when executed by the one or more processors, further cause the one or more processors to:
cause the at least one of the plurality of project management tools to be used to complete the one or more tasks.

16. The non-transitory computer-readable medium of claim 13, where the one or more instructions, when executed by the one or more processors, further cause the one or more processors to:
provide information identifying a resource utilization savings relating to causing the at least one of the plurality of project management tools to be used to complete the one or more tasks.

17. The device of claim 1, where the one or more processors are configured to:
provide an alert, or
generate a calendar event.

18. The method of claim 7, further comprising:
at least one of:
providing an alert, or
generating a calendar event.

19. The method of claim 7, further comprising:
generating a report regarding resource savings from automating the task; and
wherein generating the report regarding the resource savings from the automated task comprises one or more of:
automatically providing the report for display on the user interface,
scheduling a meeting for discussion of the report among stakeholders,
generating a press release of the report, or
generating a job listing for an employee.

20. The device of claim 1, wherein the first benchmarking and the second benchmarking are associated with at least one of:
one or more automated services, or one or more non-automated services.

* * * * *